(12) United States Patent
Hafner et al.

(10) Patent No.: US 11,971,420 B2
(45) Date of Patent: Apr. 30, 2024

(54) METHOD OF OPERATING A LABORATORY SAMPLE DISTRIBUTION SYSTEM, LABORATORY SAMPLE DISTRIBUTION SYSTEM AND LABORATORY AUTOMATION SYSTEM

(71) Applicant: Roche Diagnostics Operations, Inc., Indianapolis, IN (US)

(72) Inventors: Yannic Hafner, Munich (DE); Thomas Lienert, Munich (DE); Florian Wenzler, Gilching (DE); Dominik Schnarwiler, Emmenbruecke (CH); Philipp Heinz, Rotkreuz (CH); Bert Taeymans, Aesch (CH)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 889 days.

(21) Appl. No.: 17/012,675

(22) Filed: Sep. 4, 2020

(65) Prior Publication Data
US 2020/0400698 A1 Dec. 24, 2020

Related U.S. Application Data

(63) Continuation of application No. PCT/EP2019/054830, filed on Feb. 27, 2019.

(30) Foreign Application Priority Data

Mar. 7, 2018 (EP) .................................... 18160474

(51) Int. Cl.
*G01N 35/00* (2006.01)
*G01N 35/04* (2006.01)

(52) U.S. Cl.
CPC ....... *G01N 35/00584* (2013.01); *G01N 35/04* (2013.01); *G01N 2035/0406* (2013.01); *G01N 2035/0477* (2013.01)

(58) Field of Classification Search
CPC ...... A23J 3/14; A23J 3/20; A23J 3/225; A23J 3/227; A23J 3/26; A23J 3/265;
(Continued)

(56) References Cited

U.S. PATENT DOCUMENTS 3,273,727 A 9/1966 Rogers et al.
3,653,485 A 4/1972 Donlon
(Continued)

FOREIGN PATENT DOCUMENTS

CN 201045617 Y 4/2008
CN 102109530 A 6/2011
(Continued)

OTHER PUBLICATIONS

International Search Report dated May 16, 2019, in Application No. PCT/EP2019/054830, 3 pages.
(Continued)

*Primary Examiner* — Christine T Mui
*Assistant Examiner* — Jonathan Bortoli
(74) *Attorney, Agent, or Firm* — Woodard, Emhardt, Henry, Reeves & Wagner, LLP (57) ABSTRACT

A method of operating a laboratory sample distribution system is presented. The system comprises container carriers, a transport plane, and drive elements. The container carriers carry sample containers. The transport plane supports the container carriers. The drive elements move the container carriers on the transport plane. The method comprises planning a movement path for a container carrier from a start to a goal on the transport plane modelled by nodes. The nodes are free for one time-window or reserved for
(Continued)

one-time window. The planning comprises analyzing the reachability out of a free time-window of one node to free time-windows of a next node and an over-next node such that planned movement of the container carrier is nonstop. The method comprises reserving the planned movement path comprising a sequence of time-windows of nodes and moving the container carrier along the reserved movement path on the transport plane by a drive element.

13 Claims, 5 Drawing Sheets

(58) Field of Classification Search
CPC . A23P 30/25; A23P 30/40; G01N 2035/0406; G01N 2035/0477; G01N 35/00584; G01N 35/04; G06F 2009/4557; G06F 9/452; G06F 9/4856; H02J 50/10; H02J 50/12; H02J 50/80; H02J 7/00034; H02J 7/025; H04B 5/0037; H04L 43/08; H04L 43/16; H04L 67/10; H04L 67/1095; H04L 67/148
See application file for complete search history.

(56) References Cited

U.S. PATENT DOCUMENTS

| | | |
|---|---|---|
| 3,901,656 A | 8/1975 | Durkos et al. |
| 4,150,666 A | 4/1979 | Brush |
| 4,395,164 A | 7/1983 | Beltrop et al. |
| 4,544,068 A | 10/1985 | Cohen |
| 4,771,237 A | 9/1988 | Daley |
| 5,120,506 A | 6/1992 | Saito et al. |
| 5,295,570 A | 3/1994 | Grecksch et al. |
| 5,309,049 A | 5/1994 | Kawada et al. |
| 5,457,368 A | 10/1995 | Jacobsen et al. |
| 5,523,131 A | 6/1996 | Isaacs et al. |
| 5,530,345 A | 6/1996 | Murari et al. |
| 5,636,548 A | 6/1997 | Dunn et al. |
| 5,641,054 A | 6/1997 | Mori et al. |
| 5,651,941 A | 7/1997 | Stark et al. |
| 5,720,377 A | 2/1998 | Lapeus et al. |
| 5,735,387 A | 4/1998 | Polaniec et al. |
| 5,773,662 A | 6/1998 | Imai et al. |
| 5,788,929 A | 8/1998 | Nesti |
| 6,045,319 A | 4/2000 | Uchida et al. |
| 6,062,398 A | 5/2000 | Thalmayr |
| 6,141,602 A | 10/2000 | Igarashi et al. |
| 6,151,535 A | 11/2000 | Ehlers |
| 6,184,596 B1 | 2/2001 | Ohzeki |
| 6,191,507 B1 | 2/2001 | Peltier et al. |
| 6,206,176 B1 | 3/2001 | Blonigan et al. |
| 6,255,614 B1 | 7/2001 | Yamakawa et al. |
| 6,260,360 B1 | 7/2001 | Wheeler |
| 6,279,728 B1 | 8/2001 | Jung et al. |
| 6,293,750 B1 | 9/2001 | Cohen et al. |
| 6,429,016 B1 | 8/2002 | McNeil |
| 6,444,171 B1 | 9/2002 | Sakazume et al. |
| 6,571,934 B1 | 6/2003 | Thompson et al. |
| 7,028,831 B2 | 4/2006 | Veiner |
| 7,078,082 B2 | 7/2006 | Adams |
| 7,122,158 B2 | 10/2006 | Itoh |
| 7,278,532 B2 | 10/2007 | Martin |
| 7,326,565 B2 | 2/2008 | Yokoi et al. |
| 7,425,305 B2 | 9/2008 | Itoh |
| 7,428,957 B2 | 9/2008 | Schaefer |
| 7,578,383 B2 | 8/2009 | Itoh |
| 7,597,187 B2 | 10/2009 | Bausenwein et al. |
| 7,850,914 B2 | 12/2010 | Veiner et al. |
| 7,858,033 B2 | 12/2010 | Itoh |
| 7,875,254 B2 | 1/2011 | Garton et al. |
| 7,939,484 B1 | 5/2011 | Loeffler et al. |
| 8,240,460 B1 | 8/2012 | Bleau et al. |
| 8,281,888 B2 | 10/2012 | Bergmann |
| 8,502,422 B2 | 8/2013 | Lykkegaard |
| 8,796,186 B2 | 8/2014 | Shirazi |
| 8,833,544 B2 | 9/2014 | Stoeckle et al. |
| 8,973,736 B2 | 3/2015 | Johns et al. |
| 9,056,720 B2 | 6/2015 | Van De Loecht et al. |
| 9,097,691 B2 | 8/2015 | Onizawa et al. |
| 9,187,268 B2 | 11/2015 | Denninger et al. |
| 9,211,543 B2 | 12/2015 | Ohga et al. |
| 9,239,335 B2 | 1/2016 | Heise et al. |
| 9,248,982 B2 | 2/2016 | Eberhardt et al. |
| 9,423,410 B2 | 8/2016 | Buehr |
| 9,423,411 B2 | 8/2016 | Riether |
| 9,567,167 B2 | 2/2017 | Sinz |
| 9,575,086 B2 | 2/2017 | Heise et al. |
| 9,593,970 B2 | 3/2017 | Sinz |
| 9,598,243 B2 | 3/2017 | Denninger et al. |
| 9,618,525 B2 | 4/2017 | Malinowski et al. |
| 9,658,241 B2 | 5/2017 | Riether et al. |
| 9,664,703 B2 | 5/2017 | Heise et al. |
| 9,772,342 B2 | 9/2017 | Riether |
| 9,791,468 B2 | 10/2017 | Riether et al. |
| 9,810,706 B2 | 11/2017 | Riether et al. |
| 9,902,572 B2 | 2/2018 | Mahmudimanesh et al. |
| 9,939,455 B2 | 4/2018 | Schneider et al. |
| 9,952,242 B2 | 4/2018 | Riether |
| 9,969,570 B2 | 5/2018 | Heise et al. |
| 9,989,547 B2 | 6/2018 | Pedain |
| 10,006,927 B2 | 6/2018 | Sinz et al. |
| 10,012,666 B2 | 7/2018 | Riether |
| 10,031,150 B2 | 7/2018 | Heise et al. |
| 10,094,843 B2 | 10/2018 | Malinowski et al. |
| 10,119,982 B2 | 11/2018 | Baer |
| 10,126,317 B2 | 11/2018 | Heise et al. |
| 10,160,609 B2 | 12/2018 | Malinowski |
| 10,175,259 B2 | 1/2019 | Riether |
| 10,197,586 B2 | 2/2019 | Sinz et al. |
| 10,239,708 B2 | 3/2019 | Sinz |
| 10,261,103 B2 | 4/2019 | Pedain |
| 10,288,634 B2 | 5/2019 | Kaeppeli |
| 10,352,953 B2 | 7/2019 | Huber et al. |
| 10,416,183 B2 | 9/2019 | Hassan |
| 10,450,151 B2 | 10/2019 | Heise et al. |
| 10,495,657 B2 | 12/2019 | Malinowski |
| 10,509,049 B2 | 12/2019 | Sinz et al. |
| 2002/0009391 A1 | 1/2002 | Marquiss et al. |
| 2003/0092185 A1 | 5/2003 | Qureshi et al. |
| 2004/0050836 A1 | 3/2004 | Nesbitt et al. |
| 2004/0084531 A1 | 5/2004 | Itoh |
| 2005/0061622 A1 | 3/2005 | Martin |
| 2005/0109580 A1 | 5/2005 | Thompson |
| 2005/0194333 A1 | 9/2005 | Veiner et al. |
| 2005/0196320 A1 | 9/2005 | Veiner et al. |
| 2005/0226770 A1 | 10/2005 | Allen et al. |
| 2005/0242963 A1 | 11/2005 | Oldham et al. |
| 2005/0247790 A1 | 11/2005 | Itoh |
| 2005/0260101 A1 | 11/2005 | Nauck et al. |
| 2005/0271555 A1 | 12/2005 | Itoh |
| 2006/0000296 A1 | 1/2006 | Salter |
| 2006/0047303 A1 | 3/2006 | Ortiz et al. |
| 2006/0219524 A1 | 10/2006 | Kelly et al. |
| 2007/0116611 A1 | 5/2007 | DeMarco |
| 2007/0210090 A1 | 9/2007 | Sixt et al. |
| 2007/0248496 A1 | 10/2007 | Bondioli et al. |
| 2007/0276558 A1 | 11/2007 | Kim |
| 2008/0012511 A1 | 1/2008 | Ono |
| 2008/0029368 A1 | 2/2008 | Komori |
| 2008/0056328 A1 | 3/2008 | Rund et al. |
| 2008/0131961 A1 | 6/2008 | Crees et al. |
| 2009/0004732 A1 | 1/2009 | LaBarre et al. |
| 2009/0022625 A1 | 1/2009 | Lee et al. |
| 2009/0081771 A1 | 3/2009 | Breidford et al. |
| 2009/0128139 A1 | 5/2009 | Drenth et al. |
| 2009/0142844 A1 | 6/2009 | Le Comte |
| 2009/0180931 A1 | 7/2009 | Silbert et al. |
| 2009/0322486 A1 | 12/2009 | Gerstel |
| 2010/0000250 A1 | 1/2010 | Sixt |
| 2010/0152895 A1 | 6/2010 | Dai |
| 2010/0175943 A1 | 7/2010 | Bergmann |
| 2010/0186618 A1 | 7/2010 | King et al. |

(56) References Cited

U.S. PATENT DOCUMENTS

| | | | |
|---|---|---|---|
| 2010/0191351 A1* | 7/2010 | Miller | B65C 9/40 700/56 |
| 2010/0255529 A1 | 10/2010 | Cocola et al. | |
| 2010/0300831 A1 | 12/2010 | Pedrazzini | |
| 2010/0312379 A1 | 12/2010 | Pedrazzini | |
| 2011/0050213 A1 | 3/2011 | Furukawa | |
| 2011/0124038 A1 | 5/2011 | Bishop et al. | |
| 2011/0172128 A1 | 7/2011 | Davies et al. | |
| 2011/0186406 A1 | 8/2011 | Kraus et al. | |
| 2011/0287447 A1 | 11/2011 | Norderhaug et al. | |
| 2012/0037696 A1 | 2/2012 | Lavi | |
| 2012/0129673 A1 | 5/2012 | Fukugaki et al. | |
| 2012/0178170 A1 | 7/2012 | Van Praet | |
| 2012/0211645 A1 | 8/2012 | Tullo et al. | |
| 2012/0275885 A1 | 11/2012 | Furrer et al. | |
| 2012/0282683 A1 | 11/2012 | Mototsu | |
| 2012/0295358 A1 | 11/2012 | Ariff et al. | |
| 2012/0310401 A1 | 12/2012 | Shah | |
| 2013/0153677 A1 | 6/2013 | Leen et al. | |
| 2013/0180824 A1 | 7/2013 | Kleinikkink et al. | |
| 2013/0263622 A1 | 10/2013 | Mullen et al. | |
| 2013/0322992 A1 | 12/2013 | Pedrazzini | |
| 2014/0129172 A1 | 5/2014 | Eberhardt et al. | |
| 2014/0170023 A1 | 6/2014 | Saito et al. | |
| 2014/0234949 A1 | 8/2014 | Wasson et al. | |
| 2014/0234978 A1 | 8/2014 | Heise et al. | |
| 2015/0014125 A1 | 1/2015 | Hecht | |
| 2015/0025678 A1* | 1/2015 | Mellars | G05B 15/02 700/230 |
| 2015/0140668 A1 | 5/2015 | Mellars et al. | |
| 2015/0166265 A1 | 6/2015 | Pollack et al. | |
| 2015/0241457 A1 | 8/2015 | Miller | |
| 2015/0273468 A1 | 10/2015 | Croquette et al. | |
| 2015/0273691 A1 | 10/2015 | Pollack | |
| 2015/0276775 A1 | 10/2015 | Mellars et al. | |
| 2016/0003859 A1 | 1/2016 | Wenczel et al. | |
| 2016/0025756 A1 | 1/2016 | Pollack et al. | |
| 2016/0054341 A1 | 2/2016 | Edelmann | |
| 2016/0229565 A1 | 8/2016 | Margner | |
| 2016/0341751 A1* | 11/2016 | Huber | G01N 35/00584 |
| 2017/0108522 A1 | 4/2017 | Baer | |
| 2017/0131310 A1 | 5/2017 | Volz et al. | |
| 2017/0168079 A1 | 6/2017 | Sinz | |
| 2017/0248623 A1 | 8/2017 | Kaeppeli et al. | |
| 2017/0248624 A1 | 8/2017 | Kaeppeli et al. | |
| 2017/0363608 A1 | 12/2017 | Sinz | |
| 2018/0067141 A1 | 3/2018 | Mahmudimanesh et al. | |
| 2018/0106821 A1 | 4/2018 | Vollenweider et al. | |
| 2018/0128848 A1 | 5/2018 | Schneider et al. | |
| 2018/0188280 A1 | 7/2018 | Malinowski | |
| 2018/0210000 A1 | 7/2018 | van Mierlo | |
| 2018/0210001 A1 | 7/2018 | Reza | |
| 2018/0224476 A1 | 8/2018 | Birrer et al. | |
| 2018/0340951 A1 | 11/2018 | Kaeppell | |
| 2018/0340952 A1 | 11/2018 | Kaeppeli et al. | |
| 2018/0348244 A1 | 12/2018 | Ren | |
| 2018/0348245 A1 | 12/2018 | Schneider et al. | |
| 2019/0018027 A1 | 1/2019 | Hoehnel | |
| 2019/0076845 A1 | 3/2019 | Huber et al. | |
| 2019/0076846 A1 | 3/2019 | Durco et al. | |
| 2019/0086433 A1 | 3/2019 | Hermann et al. | |
| 2019/0094251 A1 | 3/2019 | Malinowski | |
| 2019/0094252 A1 | 3/2019 | Waser et al. | |
| 2019/0101468 A1 | 4/2019 | Haldar | |
| 2019/0285660 A1 | 9/2019 | Kopp et al. | |
| 2020/0200783 A1 | 6/2020 | Durco | |

FOREIGN PATENT DOCUMENTS

| | | |
|---|---|---|
| DE | 3909786 A1 | 9/1990 |
| DE | 102012000665 A1 | 8/2012 |
| DE | 102011090044 A1 | 7/2013 |
| EP | 0601213 A1 | 10/1992 |
| EP | 0775650 A1 | 5/1997 |
| EP | 0916406 A2 | 5/1999 |
| EP | 1122194 A1 | 8/2001 |
| EP | 1524525 A1 | 4/2005 |
| EP | 2119643 A1 | 11/2009 |
| EP | 2148117 A1 | 1/2010 |
| EP | 2327646 A1 | 6/2011 |
| EP | 2447701 A2 | 5/2012 |
| EP | 2500871 A1 | 9/2012 |
| EP | 2502675 B1 | 2/2014 |
| EP | 2887071 A1 | 6/2015 |
| EP | 2995580 | 3/2016 |
| EP | 3095739 A1 | 11/2016 |
| EP | 3096144 A1 | 11/2016 |
| GB | 2165515 A | 4/1986 |
| JP | S56-147209 A | 11/1981 |
| JP | 60-223481 A | 11/1985 |
| JP | 61-081323 A | 4/1986 |
| JP | S61-069604 A | 4/1986 |
| JP | S61-094925 A | 5/1986 |
| JP | S61-174031 A | 8/1986 |
| JP | S61-217434 A | 9/1986 |
| JP | S62-100161 A | 5/1987 |
| JP | S63-31918 A | 2/1988 |
| JP | S63-48169 A | 2/1988 |
| JP | S63-82433 U | 5/1988 |
| JP | S63-290101 A | 11/1988 |
| JP | 1148966 A | 6/1989 |
| JP | H01-266860 A | 10/1989 |
| JP | H02-87903 A | 3/1990 |
| JP | 03-112393 A | 5/1991 |
| JP | 03-192013 A | 8/1991 |
| JP | H03-38704 Y2 | 8/1991 |
| JP | H04-127063 A | 4/1992 |
| JP | H05-69350 A | 3/1993 |
| JP | H05-142232 A | 6/1993 |
| JP | H05-180847 A | 7/1993 |
| JP | 06-26808 A | 2/1994 |
| JP | H06-148198 A | 5/1994 |
| JP | 06-156730 A | 6/1994 |
| JP | 06-211306 A | 8/1994 |
| JP | 07-228345 A | 8/1995 |
| JP | 07-236838 A | 9/1995 |
| JP | H07-301637 A | 11/1995 |
| JP | H09-17848 A | 1/1997 |
| JP | H11-083865 A | 3/1999 |
| JP | H11-264828 A | 9/1999 |
| JP | H11-304812 A | 11/1999 |
| JP | H11-326336 A | 11/1999 |
| JP | 2000-105243 A | 4/2000 |
| JP | 2000-105246 A | 4/2000 |
| JP | 2001-124786 A | 5/2001 |
| JP | 2001-240245 A | 9/2001 |
| JP | 2005-001055 A | 1/2005 |
| JP | 2005-249740 A | 9/2005 |
| JP | 2006-106008 A | 4/2006 |
| JP | 2007-309675 A | 11/2007 |
| JP | 2007-314262 A | 12/2007 |
| JP | 2007-322289 A | 12/2007 |
| JP | 2009-036643 A | 2/2009 |
| JP | 2009-062188 A | 3/2009 |
| JP | 2009-145188 A | 7/2009 |
| JP | 2009-300402 A | 12/2009 |
| JP | 2010-243310 A | 10/2010 |
| JP | 2010-271204 A | 12/2010 |
| JP | 2013-172009 A | 2/2013 |
| JP | 2013-190400 A | 9/2013 |
| KR | 10-1740529 B1 | 5/2017 |
| SU | 685591 A1 | 9/1979 |
| WO | 1996/036437 A1 | 11/1996 |
| WO | 2003/042048 A3 | 5/2003 |
| WO | 2007/024540 A1 | 3/2007 |
| WO | 2008/133708 A1 | 11/2008 |
| WO | 2009/002358 A1 | 12/2008 |
| WO | 2010/042722 A1 | 4/2010 |
| WO | 2012/170636 A1 | 7/2010 |
| WO | 2010/087303 A1 | 8/2010 |
| WO | 2010/129715 A1 | 11/2010 |
| WO | 2012/158520 A1 | 11/2012 |
| WO | 2012/158541 A1 | 11/2012 |

(56) References Cited

FOREIGN PATENT DOCUMENTS

| | | |
|---|---|---|
| WO | 2013/152089 A1 | 10/2013 |
| WO | 2013/169778 A1 | 11/2013 |
| WO | 2013/177087 A2 | 11/2013 |
| WO | 2013/177163 A1 | 11/2013 |
| WO | 2014/059134 A1 | 4/2014 |
| WO | 2014/071214 A1 | 5/2014 |
| WO | 2015/104263 A2 | 7/2015 |

OTHER PUBLICATIONS

Lienert, Thomas and Fottner, Johannes, Development of a generic simulation method for the time window routing of automated guided vehicles, Logistics Journal: Proceedings, 2017, 16 pp., English abstract.

* cited by examiner

METHOD OF OPERATING A LABORATORY SAMPLE DISTRIBUTION SYSTEM, LABORATORY SAMPLE DISTRIBUTION SYSTEM AND LABORATORY AUTOMATION SYSTEM

CROSS-REFERENCE TO RELATED APPLICATIONS

This application is a continuation of PCT/EP2019/054830, filed Feb. 27, 2019, which is based on and claims priority to EP 18260474.5, filed Mar. 7, 2018, which is hereby incorporated by reference.

BACKGROUND

The present disclosure generally relates to a method of operating a laboratory sample distribution system, a laboratory sample distribution system and a laboratory automation system comprising such a laboratory sample distribution system.

Known laboratory sample distribution systems are typically used in laboratory automation systems in order to distribute laboratory samples contained in laboratory sample containers by sample container carriers between laboratory stations. In particular, pre-calculating such as, for example, fixed, routes and moving the sample container carriers along the pre-calculated routes is disclosed. During an initialization of the laboratory sample distribution, e.g. fixed routes extending over a transport plane are pre-calculated depending on, e.g. between, different transfer locations. In other words, the pre-calculated routes are provided on the transport plane between the transfer locations. After the initialization of the laboratory sample distribution system during a normal operational mode, drivers are controlled such that the sample container carriers move along the pre-calculated routes over the transport plane, if and when the sample container carriers are to be distributed between the different laboratory stations. In particular, the transport plane can be segmented into logical fields. In a time-prioritized reservation scheme, an adjustable number (e.g. 1 to 100) of logical fields positioned on or lying on a pre-calculated route can respectively be reserved for sample container carriers to be moved.

However, there is a need for a method of operating a laboratory sample distribution system that is an improved, efficient, and reliable method of calculating and performing of a movement of a sample container carrier.

SUMMARY

According to the present disclosure, a method of operating a laboratory sample distribution system is disclosed. The laboratory sample distribution system can comprise a plurality of sample container carriers, a transport plane, and a plurality of drive elements. The sample container carriers can be configured to carry a laboratory sample container. The transport plane can be configured to support the sample container carriers. The drive elements can be configured to move the sample container carriers on the transport plane. The method can comprise planning a movement path (MP) for one of the sample container carriers from a start (ST) to a goal (GA) on the transport plane. The transport plane can be logically modelled by a plurality of nodes. The nodes can be free for at least one time-window (fTW) or reserved for at least one-time window (rTW). The planning can comprise analyzing the reachability out of a free time-window (fTW) of one of the nodes (ni) to free time-windows (fTW) of at least one next node (nj) and at least one at least over-next node (nk) such that a planned movement of the one sample container carrier can be nonstop from the one node (ni) over the next node (nj) to the at least one at least over-next node (nk). The method can also comprise reserving the planned movement path (MP) comprising a sequence of time-windows (TW) of nodes (ni, nj, nk) and executing, by controlling at least one of the drive elements, such that the one sample container carrier can move along the reserved movement path (MP) on the transport plane.

Accordingly, it is a feature of the embodiments of the present disclosure to provide for a method of operating a laboratory sample distribution system that is an improved, efficient, and reliable method of calculating and performing of a movement of a sample container carrier. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

An automatic method of operating a laboratory sample distribution system is presented. The laboratory sample distribution system can comprises a plurality (e.g., 2 to 5000) of sample container carriers, a transport plane, and a plurality (e.g., 10 to 1000000) of drive elements. The sample container carriers can be configured or embodied to carry a laboratory sample container. The transport plane can be configured or embodied to support the sample container carriers. The drive elements can be configured or embodied to move the sample container carriers on or over the transport plane. The method can comprise a) planning such as, for example, automatically planning, or calculating or searching for a movement path for one of the sample container carriers from a start or an origin to a goal or a destination on the transport plane. The, in one embodiment, whole, transport plane such as, for example, its layout, can be logically modelled or abstracted by a plurality (e.g., 10 to 1000000) of nodes. The nodes can be free or available for at least one time-window or reserved or unavailable for at least one-time window. The planning can comprise analyzing, for example, automatically analyzing, the reachability or the accessibility out of a free time-window of one of the nodes to free time-windows of at least one next node such as, for example, of a plurality of next nodes such as, for example, of all next nodes, and at least one at least over-next node such as, for example, of a plurality of at least over-next nodes such as, for example, all at least over-next nodes such that a planned movement or segment of the one sample container carrier can be nonstop or uninterrupted from the one node over the next node to the at least one at least over-next node. Reserving, for example, automatically or logically reserving, the planned movement path comprising a sequence of such as, for example, until then free, time-windows of nodes. The method also comprises b) executing, for example, automatically executing, by controlling, for example, by automatically controlling, at least one of the drive elements such that the one sample container carrier can move along the reserved movement path on the transport plane.

This method can provide for an improved such as, for example, an efficient and reliable, planning and executing of the movement or the drive of the, for example, one, sample container carrier.

This method can be advantageous for implementation on a real-time system such as, for example, on a real-time laboratory sample distribution system, in which during or simultaneously to the planning of a movement path or a drive of one of the sample container carriers the executing of at least one movement path or drive of at least another one of the sample container carriers may be performed. In other words: the planning of the time windows may lead to the proper, for example, strict, separation of step a), namely the planning, and step b), the executing. Differently formulated, reserving may be performed or take only place during the planning step a), for example, before the drive. Thereby, a real-time capability may not be affected. In other words, during the executing step b) or the drive no reserving or no changing of a reservation may be performed or take place and/or a sequence of reserved time-windows of sample container carriers on at least one of the nodes may not be changed.

Furthermore, this method may enable finding the best, for example, fastest, movement path considering a current traffic situation in real-time. Additionally, or alternatively, this method may enable considering changes and/or unexpected obstacles during runtime. In one embodiment, a transport infrastructure and/or the reachability of goals may change. Additionally, or alternatively, another one of the sample container carriers, the transport plane and/or one of the drive elements may have an error and cause an obstacle.

Moreover, this method may enable a relatively accurate drive time calculation or estimation and/or a handling of a variability of drive times.

Further, this method may enable a relatively short planning period of step a). Additionally, the movement or the drive planned may comprise at least one nonstop movement or segment. Thereby, the one sample container carrier may reach a relatively high speed and a relatively fast movement or drive may be enabled.

In detail the, for example, one, sample container carrier may be configured or embodied to carry only one or a single laboratory sample container. The sample container carrier may be denoted as single sample container carrier.

The laboratory sample container may be designed as a tube and/or may have an opening at an upper, top and/or face end. Furthermore, the laboratory sample container may be made of glass or transparent plastic or any other, for example, somewhat, solid material. Moreover, the laboratory sample container or its opening may be closed by a closure or a cap. The closure may comprise rubber and/or plastic or may completely consist of rubber and/or plastic. Further, the closure may be embodied as a foil such as, for example, a flexible foil, or film or tape or as a lid such as, for example, a rigid lid.

Furthermore, the laboratory sample container may be configured or embodied to contain a laboratory sample. The laboratory sample may be a blood sample, a serum sample, a plasma sample, a urine sample, a CFS sample, a body sample, a water sample or a chemical sample. In one embodiment, the laboratory sample may be a liquid.

The laboratory sample container or its opening may be open for processing, for example, analyzing, the laboratory sample, if present.

The transport plane may be denoted as transport surface. To support the sample container carriers may be denoted to carry the sample container carriers. The sample container carriers may be translationally moved on or over the transport plane. Furthermore, the sample container carriers may be configured to move in two dimensions on the transport plane. Moreover, the sample container carriers may slide over the transport plane.

The drive elements may be electric drive elements.

In one embodiment, a movement or movements of the sample container carrier forming the movement path may be denoted as drive. The movement path may be planned iteratively or in sections or segments.

The movement path of the one sample container carrier may be individual, for example, unique. In one embodiment, a next time, even though the start and the goal may be the same ones as before, a next planned movement path may be different from the one before. In other words, the time-window analyzing may be used to plan or to obtain the movement path for the sample container carrier dynamically.

The start and the goal of the sample container carrier may be individual, for example, unique. In one embodiment, the start may be the current location of the sample container carrier.

The transport plane may comprise a plurality of, for example, logical, transfer locations, wherein the start and/or the goal may be one of the transfer locations.

The transfer locations may be, for example, logically, assigned or allocated to laboratory stations. For example, each laboratory station may have a single corresponding transfer location. Alternatively, more than one transfer location may be assigned to a corresponding laboratory station. Additionally, or alternatively, the transfer locations may be, for example, logically, assigned or allocated to buffer areas located on the transport plane. For example, each buffer area may have a single corresponding transfer location. Alternatively, more than one transfer location may be assigned to a corresponding buffer area. The transfer locations may be statically or dynamically assigned to the laboratory stations and/or the buffer areas. In other words, during operation the transfer locations may be changed, if necessary.

The start and the goal such as, for example, the transfer locations, if present, may be, for example, logically, assigned or correspond to nodes or be represented by nodes.

The nodes may represent fields or areas, for example, of identical size and outline, on the transport plane. In one embodiment, a respective size of the nodes or the fields may correspond to a respective size such as, for example, to a respective footprint, of the sample container carriers on the transport plane. Additionally, or alternatively, the nodes or the fields may be arranged in two dimensions, for example, in a grid having rows and columns.

Furthermore, the nodes may form a graph, for example, a directed graph, in the sense of graph theory or a data structure of nodes in particular in form of a table.

The movement path may be planned by an, for example, iterative, search algorithm.

For each node, a list of free time-windows and reserved time-windows may be maintained or stored, for example, by the search algorithm.

A free time-window of a node may be defined by an end of a previous or antecent reserved time-window of the node and a beginning of a following or subsequent reserved time-window of the node. In one embodiment, the node may be reserved, for example, occupied, by at least one another of the sample container carriers. Additionally, or alternatively, a node may be, for example, permanently, reserved in case of an unexpected obstacle, by a buffer area and/or in order to represent the, for example, specific, layout of the transport plane. Additionally, or alternatively, in the case of an unexpected obstacle, the nodes, for example, the graph or the data structure of the nodes may be modified, for example, by the search algorithm.

The nodes and their time-windows may form a time-window graph or a data structure of the nodes and/or the time-windows, for example, in the form of a table. Furthermore, the search algorithm may, for example, read and, search in the time-window graph or the data structure, for example, in space and time, the movement path.

At least one iteration or loop, for example, a plurality of iterations, for example, all iterations, of the search algorithm may comprise analyzing the reachability out of a free time-window of one of the nodes to free time-windows of at least one next node and at least one at least over-next node such that a planned movement or segment of the one sample container carrier can be nonstop from the one node over the next node to the at least one at least over-next node.

In one embodiment, with the exception, that if the next node is the final node, for example, the goal and/or reachable, the planning may not have to comprise analyzing an over-next node.

In other words, the planning may comprise analyzing the reachability out of a free time-window of one of the nodes to a free time-window of at least one next node, and if reachable, the reachability out of the free time-window of the next node to a free time-window of at least one at least over-next node, in particular and if reachable, and so on. Additionally, if the time-window of the at least one next node is not reachable, for example, reserved, the planning may comprise analyzing the reachability out of the free time-window of the one of the nodes to a free time-window of at least another one next node, if present, and if reachable, the reachability out of the free time-window of the another next node to a free time-window of at least one at least over-next node, in particular and if reachable, and so on. Additionally, or alternatively, if the time-window of the at least one at least over-next node is not reachable, for example, reserved, the planning may comprise analyzing the reachability out of the free time-window of the next node or, if not reachable, the another one next node, in particular if reachable, to a free time-window of at least another one over-next node, if present, in particular and so on.

The at least one next node may be denoted as neighboring or contiguous node. The at least one at least over-next node may be denoted as non-neighboring or non-contiguous node. Additionally, or alternatively, at least over-next node may comprise an over-next node, an over-over-next node, an over-over-over-next node and so on.

In one embodiment, the planning may be such that the planned nonstop movement can extend over at least three nodes, in another embodiment, over at least four nodes, in yet another embodiment, over at least five nodes, in still another embodiment, over at least ten nodes, and, in still yet another embodiment, over at least twenty nodes. The nonstop movement may be a straight movement. In other words, a movement or segment length of the planned nonstop movement may be limited or bounded by a, for example, necessary, movement turn.

Following the planning of the nonstop movement a next, for example, nonstop, movement for the movement path, for example, towards the goal or the start, may be planned.

In detail, for a free time-window to be reachable, it may be necessary that one or more conditions have to be met. A condition may be a sufficient overlapping, for example, between free time-windows. Furthermore, a condition may be a minimal period or size of the free time-window. In one embodiment, the minimal free time-window period may depend or be based on an average movement or drive time or speed of the sample container carriers. Additionally, or alternatively, a condition may be a movement direction or an orientation, along which a node can be moved or driven. In one embodiment, the reachability may be restricted or limited, for example, by defined one-ways, for example, defined in determined areas of the transport plane or in between determined nodes, respectively. In other words, a movement of a sample container carrier from one node to a next node may be allowed but a movement of a sample container carrier from the next node to the one node may be forbidden.

The result of the planning may be a list that can comprise or contain all the nodes along the movement path and the corresponding time-windows, which may be defined by the entry times and the exit times at the nodes or the occupation, respectively.

The time-windows of the nodes may be reserved, for example, for the first time for the movement path or the drive. In detail, the reservation may be written to the time-window graph or a data structure of the time-windows, respectively.

During the executing step b) or the drive not reserving or not changing of a reservation may be performed or take place and/or a sequence of reserved time-windows of sample container carriers on at least one of the nodes may not be changed. In other words, the method may not have to require simultaneous write, for example, read and write, access to the time-window graph or the data structure, respectively, from planning step a) of the one sample container carrier and from the executing step b) of at least one another of the sample container carriers.

Analyzing may comprise reading reserved time-windows from and/or searching free time-windows in the time-window graph or the data structure, respectively.

A step may be denoted as phase.

In one embodiment, step b) may be performed after step a).

According to an embodiment, step a) can comprise planning such as, for example, automatically planning, the nonstop movement or segment in dependence of an acceleration and/or a maximum speed, for example, if reached, and/or a deceleration, for example, of a sample container carrier. This can enable an increase an efficiency, for example, a throughput, of the laboratory sample distribution system. In one embodiment, as a length of the nonstop movement or segment, for example, a first node, a last node and at least one node in between or on the transport plane, respectively, may be known during the planning step a), the acceleration on the first node or the corresponding part of the transport plane and/or the deceleration on the last node or the corresponding part of the transport plane and/or the maximum speed, if reached, on nodes in between may be considered. This may enable a relatively accurate drive time calculation. Furthermore, this may enable planning and reserving relatively short time-windows for the movement path. In one embodiment, the acceleration may be an average, for example, constant, acceleration and/or may comprise a value from about 0.1 meter per square second (m/s$^2$) to about 100 m/s$^2$ and in another embodiment, from about 1 m/s$^2$ to about 10 m/s$^2$. The maximum speed may be an average, for example, constant, speed and/or may comprise a value from about 0.01 meter per second (m/s) to about 100 m/s and in another embodiment from about 0.1 m/s to about 10 m/s. The deceleration may be an average, for example, constant, deceleration and/or may comprise a value from about 0.1 m/s$^2$ to about 100 m/s$^2$ and in another embodiment, from about 1 m/s$^2$ to about 10 m/s$^2$.

According to an embodiment, step a) can comprise reserving, for example, automatically reserving, for the planned nonstop movement or segment, for example, of the one sample container carrier, time-windows with same beginning or entry time, for example, of all nodes of the nonstop movement. This can enable avoidance or prevention a reservation/s of a movement/s of at least one another of the sample container carriers, for example, of a node after the first node of the planned nonstop movement or segment, which executing might interfere with the executing of the nonstop movement or segment of the one sample container carrier such as, for example, causing an interruption of the movement such that it may not be nonstop anymore.

According to an embodiment, a distance number of the at least over-next nodes can be limited or bounded such that the planned nonstop movement or segment has a limited movement or segment length, for example, on the transport plane. This can enable that not too many nodes are reserved and thus avoiding that at least one another of the sample container carriers may be hindered or blocked, for example, in its/their movement path planning, for example, if the same beginning time is reserved for the planned nonstop movement of the one sample container carrier. In one embodiment, the distance number may define a distance from a node to a next node. For example, the distance number two may mean considering only the at least one next node and the at least one over-next node, but not an over-over-next node. In one embodiment, the distance number may be maximally nineteen, in another embodiment, maximally nine, and in yet another embodiment maximally four. Additionally, or alternatively, the distance number may be minimally one.

According to an embodiment, step a) can comprise analyzing, for example, automatically analyzing, the reachability to, for example, free, time-windows only in the future after a planning period. This can enable insurance that the planning step a) can be performed or finished or completed before the executing step b) is performed or started. In other words, for the executing step b) or its start time, not time-windows at the current or actual time may be considered, but time-windows at or after the current time plus the planning period may be considered. The planning period may be denoted as anticipation horizon time. In one embodiment, the planning period may comprise a, for example, minimal and/or maximal, value from about 0.1 milliseconds (ms) to about 10000 ms and, in another embodiment, from about 1 ms to about 1000 ms.

According to an embodiment, the method can comprise performing step a), for example, for the transport plane or the nodes, for example, for only one of the sample container carriers at a time, and, for example, for no other sample container carrier at the same time. In other words, the multi-agent path problem can be solved sequentially for the sample containers carriers. Differently formulated, the planning steps a) of the movement paths for the sample container carriers may be done one after another. However, the executing steps b) of the movement paths may take place simultaneously. This sequential approach can enable avoiding or preventing simultaneously reserving for at least two, for example, different, of the sample container carriers. In one embodiment, simultaneous reservations may interfere, for example, a same node/s may be reserved, and thus may lead to a conflict. However, if the laboratory sample distribution system comprises different, for example, not interfering and/or independent, transport planes logically modelled by different nodes, respectively, for the different transport planes or their nodes step a) may be performed simultaneously.

According to an embodiment, step a) can comprise planning, for example, automatically planning, the movement path such that a movement path period, a movement path length, and/or a number of movement turns can be minimized and/or such that wear of the transport plane and/or wear of the drive elements can be balanced. This may enable that the planned movement path can be the fastest or the shortest and/or the shortest movement path through the free time-windows. Additionally, or alternatively, this may enable that an aging effect/s may be balanced. This may be denoted as taking into account one or more criteria into a cost function of the planning such as, for example, which may dynamically change in real-time (e.g., take into account the wear to balance the aging effect/s).

According to an embodiment, step a) can comprise planning, for example, automatically planning, the movement path using an informed search algorithm such as, for example, an A*-algorithm or a D*-algorithm. In one embodiment, the A*-algorithm can be an algorithm that can be used in path finding and graph traversal, to efficiently calculate a traversable path between different nodes, e.g., in the form of the start, the goal, and, for example, the transfer locations, if present. The A*-algorithm uses a best-first search and finds a least-cost path from a given start node to one goal node. As the A*-algorithm traverses the graph, it follows a path of the lowest expected total cost, keeping a sorted priority queue of alternate path segments along the way. The D*-algorithm is a refined A*-algorithm. Regarding further details, reference is made to the corresponding technical literature.

According to an embodiment, step b) can comprise executing, for example, automatically executing, for example, of the reserved movement path or a movement of the reserved movement path, when a start time, for example, the beginning time, has come. In one embodiment, the start time or the beginning time, if present, may be different from the current time plus the planning period, if present, for example, later.

According to an embodiment, step b) can comprise executing, for example, automatically executing, the reserved movement path or a movement of the reserved movement path such that a sequence of reserved time-windows of, for example, different, sample container carriers on at least one, for example, on a plurality, for example, on all, of the nodes can be maintained, for example, as planned. This can enable avoiding or preventing deadlocks, situations where one or more of the sample container carriers could be blocked forever, or collisions and thus a steady-state throughput of the sample container carriers and/or laboratory sample containers may be ensured. Additionally, this can enable providing information of an arrival sequence, for example, before the executing step b) or the drive starts. In one embodiment, the executing step/s b) or the movement/s of the reserved movement path or its/their start time/s or beginning time/s, if present, may be decoupled from the planned and/or reserved time-windows or times, respectively. An unexpected delay of one of the sample container carriers on a part of the transport plane logically modelled by the one node may occur and thus there may be a deviation from the planned time-windows or times, respectively, of the sample container carriers, for example, the planned time-windows may not be met.

According to an embodiment, the method can comprise determining, for example, automatically determining, a waiting period for executing the reserved movement path or a movement or segment of the reserved movement path and, if the determined waiting period exceeds or upon exceedance of a waiting period limit, re-planning, for example, automatically re-planning, a movement path, for example, for the one sample container carrier. In one embodiment, the method may comprise repeating step a), for example, only for the waiting sample container carrier, for example, for a plurality of the sample container carriers, for example, for all of the sample container carriers. This can enable reacting on unexpected obstacles, for example, that may introduce major delays to the executing step b) of the planned and reserved movement path or a movement of the reserved movement path. In one embodiment, the waiting period limit may comprise, for example, a minimal and/or maximal, value from about 0.1 seconds (s) to about 1000 s and, in another embodiment, from about 1 s to about 100 s.

According to an embodiment, step b) can comprise deleting a reserved time-window of a node or releasing the reserved node, respectively, for example, in the time-window graph or the data structure, respectively, after leaving or passing the, for example, reserved, node by the one sample container carrier.

According to an embodiment, the sample container carriers, for example, can comprise a magnetically active device. The drive elements can comprise a plurality (e.g., 10 to 1000000) of electro-magnetic actuators. The electro-magnetic actuators can be stationary arranged below the transport plane and can be configured or embodied to move the sample container carriers on the transport plane by applying a magnetic move force to the sample container carriers. The nodes can be, for example, logically, assigned to the electro-magnetic actuators, for example, to their locations or positions. Step b) can comprise executing, for example, automatically executing, by controlling, for example, by automatically controlling, the electro-magnetic actuators such that the one sample container carrier can move along the reserved movement path on the transport plane.

In one embodiment, the electro-magnetic actuators may be configured to generate a magnetic field to move the, for example, one, sample container carrier on the transport plane. The magnetically active device may be configured to interact with the magnetic field generated by the electro-magnetic actuators such that the magnetic move force can be applied to the sample container carrier. In one embodiment, the magnetically active device may be a permanent magnet or an electro-magnet. Additionally, or alternatively, the magnetically active device may comprise a magnetically soft material. The electro-magnetic actuators may be solenoids or coils surrounding ferromagnetic cores. Furthermore, the electro-magnetic actuators may be driven or energized individually in order to generate or to provide the magnetic field. Moreover, the electro-magnetic actuators may be arranged in two dimensions, for example, in a grid having rows and columns, along which the electro-magnetic actuators can be arranged. Further, the electro-magnetic actuators may be arranged in a plane parallel to the transport plane.

One, for example, a plurality, for example, all, of the nodes or fields may be defined or located on the transport plane above the corresponding electro-magnetic actuator/s or may cover the corresponding electro-magnetic actuator/s.

Additionally, or alternatively, the drive elements may comprise a plurality of wheels and drive motors, respectively, to drive the wheels. The drive motors and the wheels may be configured to move the sample container carriers on the transport plane. Step b) may comprise executing, for example, automatically executing, by controlling, for example, by automatically controlling, the wheels and/or the drive motors such that the one sample container carrier can move along the reserved movement path on the transport plane. In one embodiment, the sample container carriers, respectively, may comprise at least one of the wheels and/or at least one of the drive motors.

A laboratory sample distribution system is also disclosed. The laboratory sample distribution system can comprise a plurality of sample container carriers, a transport plane, a plurality of drive elements and a control device. The sample container carriers can be configured to carry a laboratory sample container. The transport plane can be configured to support the sample container carriers. The drive elements can be configured to move the sample container carriers on the transport plane. The control device can be configured to plan, for example, to automatically plan, a movement path for one of the sample container carriers from a start to a goal on the transport plane. The transport plane can be logically modelled by a plurality of nodes. The nodes can be free for at least one time-window or reserved for at least one-time window. The planning can comprise analyzing, for example, automatically analyzing, the reachability out of a free time-window of one of the nodes to free time-windows of at least one next node and at least one at least over-next node such that a planned movement of the one sample container carrier can be nonstop from the one node over the next node to the at least one over-next node. Furthermore, the control device can be configured to reserve, for example, to automatically reserve, the planned movement path comprising a sequence of time-windows of nodes. Moreover, the control device can be configured to execute, for example, to automatically execute, by controlling, for example, by automatically controlling, at least one of the drive elements such that the one sample container carrier can move along the reserved movement path on the transport plane.

In one embodiment, the laboratory sample distribution system, for example, its control device, may be configured to perform the method as described above.

The control device may comprise or be an integrated circuit, a tablet computer, a smartphone or a computer. Additionally, or alternatively, the control device may comprise or be a microprocessor and a method or program storage.

According to an embodiment, the sample container carriers can comprise a magnetically active device. The drive elements can comprise a plurality of electro-magnetic actuators. The electro-magnetic actuators can be stationary arranged below the transport plane and can be configured or embodied to move the sample container carriers on the transport plane by applying a magnetic move force to the sample container carriers. The nodes can be, for example, logically, assigned to the electro-magnetic actuators. The control device can be configured to execute, for example, to automatically execute, by controlling, for example, by automatically controlling, the electro-magnetic actuators such that the one sample container carrier can move along the reserved movement path on the transport plane.

A laboratory automation system is also presented. The laboratory automation system can comprises a plurality (e.g., 2 to 50) of laboratory stations and a laboratory sample distribution system as described above. The laboratory sample distribution system can be configured or embodied to move the sample container carriers to the laboratory stations or to distribute the sample container carriers in between the laboratory stations, respectively.

In one embodiment, the laboratory stations may comprise pre-analytical, analytical and/or post-analytical laboratory stations. Pre-analytical laboratory stations may be configured to perform any kind of pre-processing of a laboratory sample, a laboratory sample container and/or a sample container carrier. Analytical laboratory stations may be configured to use a laboratory sample or a part of a laboratory sample and a reagent to generate a measuring signal, the measuring signal indicating if and in which concentration, if any, an analyte exists. Post-analytical laboratory stations may be configured to perform any kind of post-processing of a laboratory sample, a laboratory sample container and/or a sample container carrier. The pre-analytical, analytical and/ or post-analytical laboratory stations may comprise at least one of a decapping station, a recapping station, an aliquot station, a centrifugation station, an archiving station, a pipetting station, a sorting station, a tube type identification station, a sample quality determining station, an add-on buffer station, a liquid level detection station, a sealing/desealing station, a pushing station, a belt station, a conveying system station and/or a gripper station for moving a laboratory sample container to or from a sample container carrier.

Furthermore, the laboratory stations may be arranged adjacent or directly next to the laboratory sample distribution system, for example, to its transport plane.

The transport plane may comprise a plurality of transfer locations, wherein the transfer locations may be, for example, logically, assigned to the laboratory stations.

Laboratory samples, and/or laboratory sample containers, and/or the sample container carriers may be transferred to/from the laboratory stations using the transfer locations. For example, a pick-and-place device may pick a laboratory sample container comprised in or carried by one of the sample container carriers located at or on one of the transfer locations and may transfer the laboratory sample container to the laboratory station. Additionally, or alternatively, a laboratory sample container may be transferred from one of the laboratory stations to one, for example, empty, of the sample container carriers located on one of the transfer locations.

Figure 1:
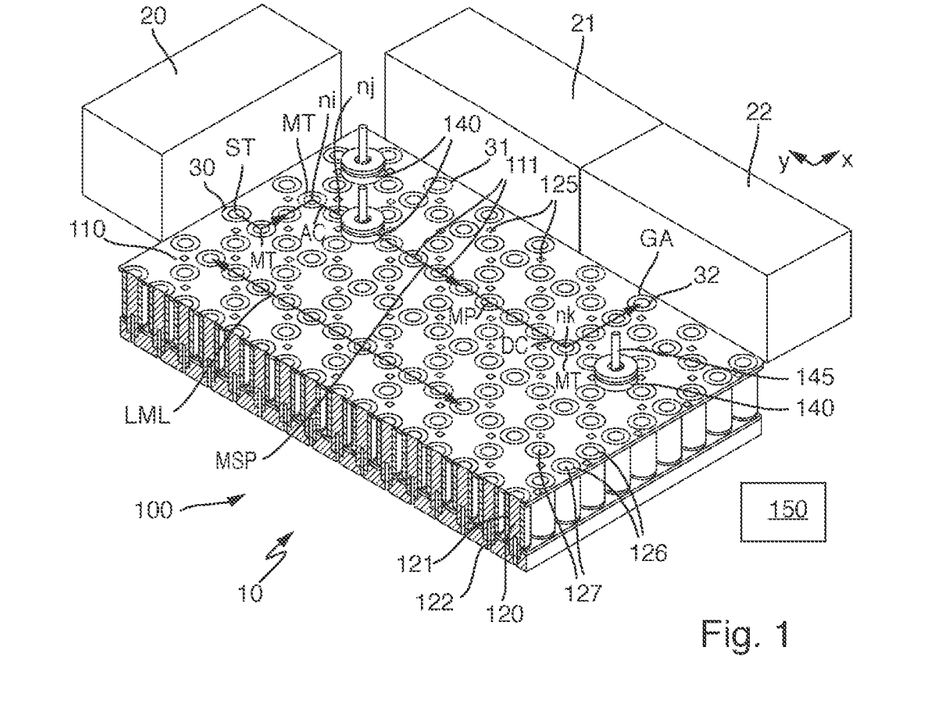
FIG. 1 illustrates schematically a perspective view of a laboratory automation system comprising a laboratory sample distribution system according to an embodiment of the present disclosure.

Referring initially to FIG. 1, FIG. 1 shows an inventive laboratory automation system 10. The laboratory automation system 10 can comprise a plurality of laboratory stations 20, 21, 22 and a laboratory sample distribution system 100.

In the shown embodiment, the laboratory automation system 10 can comprise three laboratory stations 20, 21, 22. In alternative embodiments, the laboratory automation system may comprise more than three laboratory stations.

The laboratory sample distribution 100 system can comprise a plurality of sample container carriers 140, a transport plane 110, a plurality of drive elements 120 and a control device 150. The sample container carriers 140 can be configured to carry a laboratory sample container 145. The transport plane 110 can be configured to support the sample container carriers 140. The drive elements 120 can be configured to move the sample container carriers 140 on the transport plane 110.

In the embodiment shown in FIG. 1, the laboratory sample distribution 100 can comprise three sample container carriers 140. In alternative embodiments, the laboratory sample distribution system may comprise more than three sample container carriers.

The laboratory sample containers 145 respectively can contain laboratory samples to be analyzed by the laboratory stations 20, 21, 22.

The laboratory sample distribution system 100 can be configured to move the sample container carriers 140 to the laboratory stations 20, 21, 22.

In the shown embodiment, the laboratory stations 20, 21, 22 can be arranged adjacent to the laboratory sample distribution system 100, for example, to its transport plane 110.

In detail, the sample container carriers 140 can be translationally moved in two dimensions x, y substantially perpendicular to each other on the transport plane 110.

In the shown embodiment, the sample container carriers 140 respectively can comprise a sliding surface configured to be in, for example, direct, contact with the transport plane 110 and can enable performing movements, for example, slides, of the sample container carriers 140 on the transport plane 110.

Figure 2:
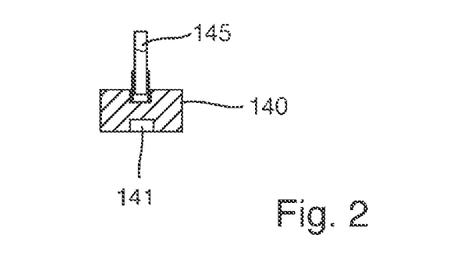
FIG. 2 illustrates schematically a longitudinal section view of a sample container of the laboratory sample distribution system of FIG. 1 according to an embodiment of the present disclosure.

In detail, the sample container carriers 140 can comprise a magnetically active device 141, as shown in FIG. 2, for example, in the form of a permanent magnet. The drive elements 120 can comprise a plurality of electro-magnetic actuators 121. The electro-magnetic actuators 121 can be stationary arranged below the transport plane 110 and can be configured to move the sample container carriers 140 on the transport plane 110 by applying a magnetic move force to the sample container carriers 140.

In the shown embodiment, the electro-magnetic actuators 121 respectively can comprise a solenoid surrounding a ferromagnetic core 122.

Furthermore, the electro-magnetic actuators 121 can be quadratically arranged in a grid having rows 126 and columns 127, for example, in a plane substantially parallel to the transport plane 110. In each center of a quadrat formed by corresponding electro-magnetic actuators 121 no electro-magnetic actuator is arranged. In other words, in each second row and in each second position, there is no electro-magnetic actuator 121.

Moreover, the laboratory sample distribution system 100 can comprise a plurality of position sensors 125, for example, in the form of Hall-sensors and/or inductive sensors. The position sensors 125 can be arranged such that a position or a location of a respective sample container carrier 140, for example, of its magnetically active device 141, on the transport plane 110 can be detected. The control device 150 can be functionally coupled to, for example, in signal connection with, the position sensors 125 for detecting the position of the sample container carrier 140. The control device 150 can be configured to control the drive elements 120, for example, the electro-magnetic actuators 121, in response to the detected position.

Figure 3:
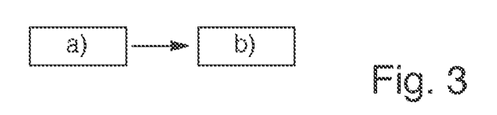
FIG. 3 illustrates schematically a method of operating the laboratory sample distribution system of FIG. 1 according to an embodiment of the present disclosure.
Figure 4:
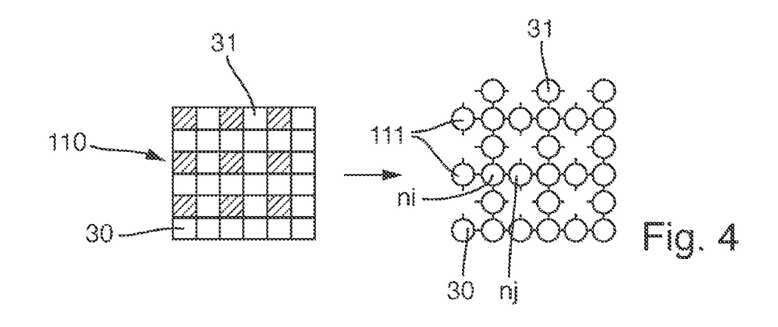
FIG. 4 illustrates schematically a top view of a transport plane of the laboratory sample distribution system of FIG. 1 logically modelled by a plurality of nodes by the method of FIG. 3 according to an embodiment of the present disclosure.
Figure 5:
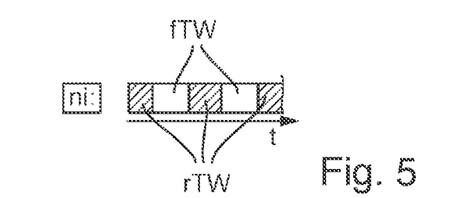
FIG. 5 illustrates schematically a list of free time-windows and reserved time-windows of a node according to an embodiment of the present disclosure.
Figure 6:
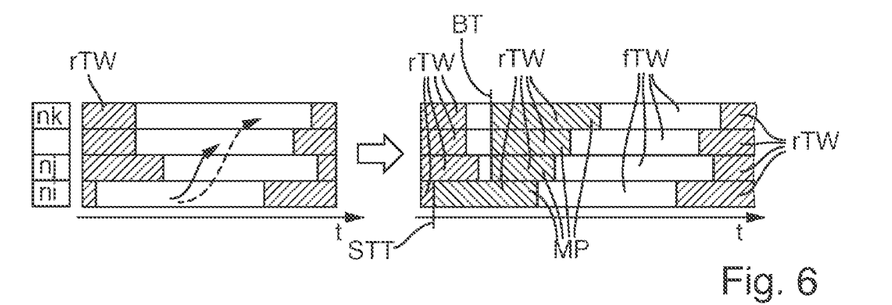
FIG. 6 illustrates schematically a part of a time-window graph or a data structure, respectively, comprising reserved time-windows of a planned nonstop movement by the method of FIG. 3 according to an embodiment of the present disclosure.
Figure 9:
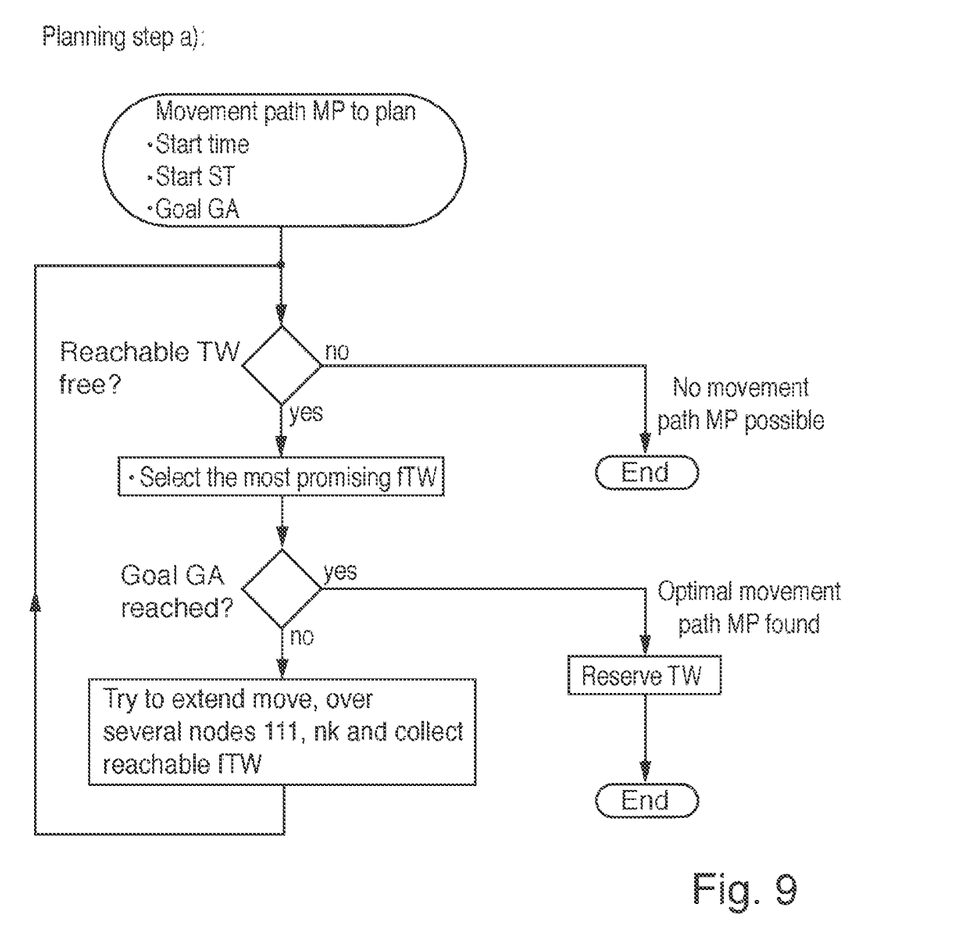
FIG. 9 illustrates schematically a flowchart of the planning step of the method of FIG. 3 according to an embodiment of the present disclosure.
Figure 10:
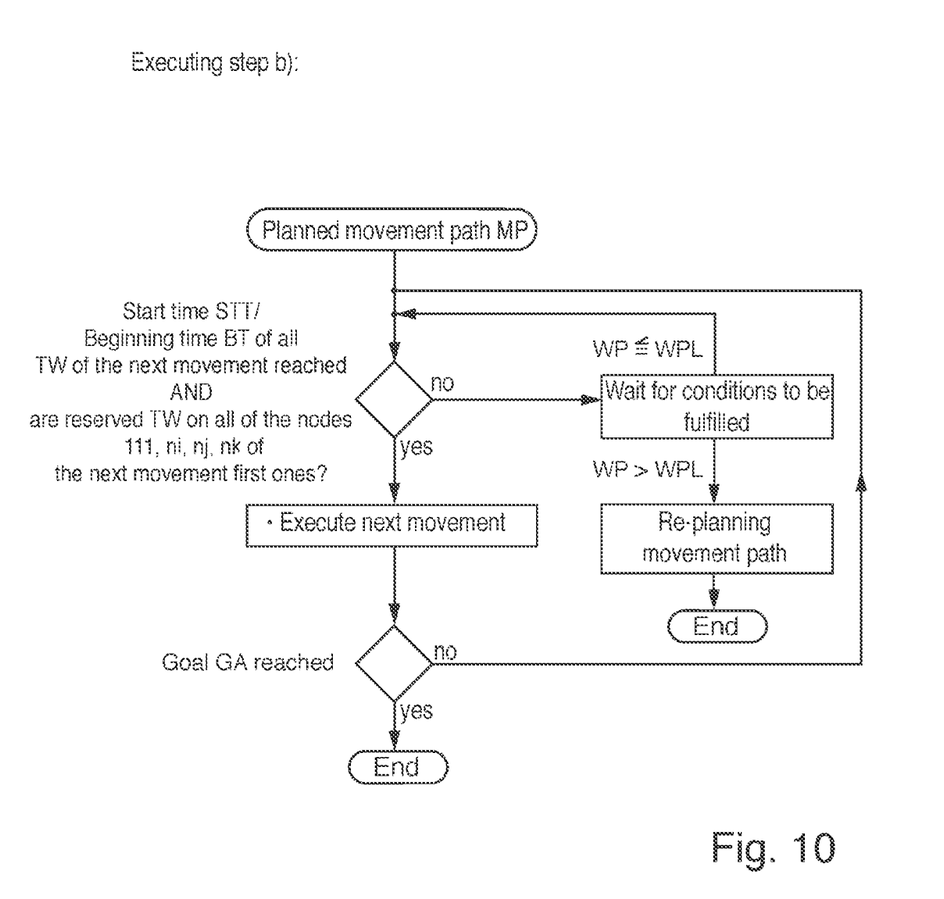
FIG. 10 illustrates schematically a flowchart of the executing step of the method of FIG. 3 according to an embodiment of the present disclosure.

FIG. 3 shows a method of operating the laboratory sample distribution system 100. The method can comprise step a) planning a movement path (MP) for one of the sample container carriers 140 from a start (ST) to a goal (GA) on the transport plane 110, as shown in FIGS. 1 and 9. The transport plane 110 can be logically modelled by a plurality nodes 111, as shown in FIG. 4. The nodes 111 can be free for at least one time-window (fTW) or reserved for at least one-time window (rTW), as shown in FIG. 5. The planning can comprise analyzing the reachability out of a free time-window (fTW) of one of the nodes (ni) to free time-windows (fTW) of at least one next node (nj) and at least one at least over-next node (nk) such that a planned movement of the one sample container carrier 140 can be nonstop from the one node (ni) over the next node (nj) to the at least one at least over-next node (nk), as shown in FIG. 6. Reserving the planned movement path (MP) comprising a sequence of time-windows (TW) of nodes 111 (ni, nj, nk). The method can also comprise step b) executing by controlling at least one of the drive elements 120 such that the one sample container carrier 140 can move along the reserved movement path (MP) on the transport plane 110, as shown in FIGS. 1 and 10.

The control device 150 can be configured to plan the movement path (MP) for the one of the sample container carriers 140 from the start (ST) to the goal (GA) on the transport plane 110. The transport plane 110 can be logically modelled by the plurality of nodes 111. The nodes 111 can be free for at least one time-window (fTW) or reserved for at least one-time window (rTW). The planning can comprise analyzing the reachability out of the free time-window (fTW) of the one of the nodes (ni) to free time-windows (fTW) of the at least one next node (nj) and the at least one at least over-next node (nk) such that the planned movement of the one sample container carrier 140 can be nonstop from the one node (ni) over the next node (nj) to the at least one over-next node (nk). Furthermore, the control device 150 can be configured to reserve the planned movement path (MP) comprising the sequence of time-windows (TW) of nodes 111 (ni, nj, nk). Moreover, the control device 150 can be configured to execute by controlling the at least one of the drive elements 120 such that the one sample container carrier 140 can move along the reserved movement path (MP) on the transport plane 110.

In the shown embodiment, the laboratory sample distribution system 100, for example, its control device 150, can be configured to perform the method as described above.

Furthermore, in the shown embodiment, the sample container carriers 140 respectively can move simultaneously and independently from one another along corresponding, for example, individual, reserved movement paths (MP) on the transport plane 110. In one embodiment, the control device 150 can be embodied for this purpose.

In detail, the nodes 111 can be assigned to or cover the electro-magnetic actuators 121, as shown in FIGS. 1 and 4.

The control device 150 can be configured to execute by controlling the electro-magnetic actuators 121 such that the one sample container carrier 140 can move along the reserved movement path (MP) on the transport plane 110.

Step b) can comprise executing by controlling the electro-magnetic actuators 121 such that the one sample container carrier 140 can move along the reserved movement path (MP) on the transport plane 110.

In the embodiment shown in FIG. 1, a respective size or footprint, for example, a diameter, of the sample container carriers 140 on the transport plane 110 can correspond to or can be twice a distance of neighboring electro-magnetic actuators 121. In alternative embodiments, the respective size of the sample container carriers with respect to the distance of neighboring electro-magnetic actuators may be different. In one embodiment, the respective size of the sample container carriers on the transport plane may correspond to or be the distance of neighboring electro-magnetic actuators.

Furthermore, in the shown embodiment, the transport plane 110 can comprise a plurality of transfer locations 30, 31, 32. The transfer location 30 can be assigned to the laboratory station 20, the transfer location 31 can be assigned to the laboratory station 21 and the transfer location 32 can be assigned to the laboratory station 22.

In the embodiment shown in FIG. 1, the start ST of the movement path (MP) can be the transfer location 30. The goal (GA) of the movement path (MP) can be the transfer location 32. A next time for a next to be planned movement path of the one sample container carrier, the start and/or the goal may be a different transfer location/s.

In detail, the start (ST) and the goal (GA), and in particular the transfer locations 30, 31, 32, can be assigned or correspond to nodes 111 or are represented by nodes 111.

The nodes 111 can form a graph or a data structure, as shown in FIG. 4 on the right side.

Figure 8:
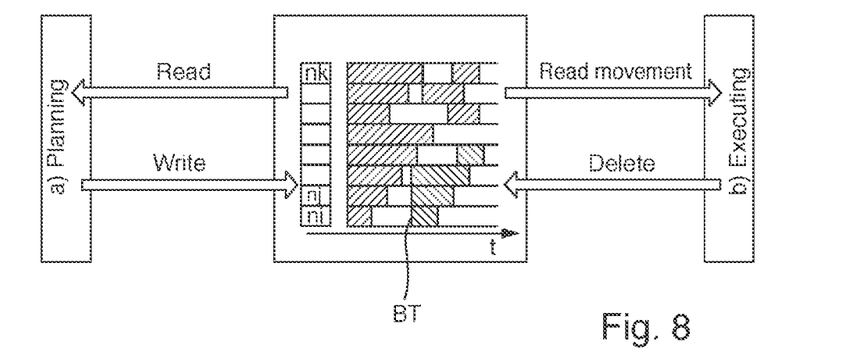
FIG. 8 illustrates schematically the planning step reading from and writing to the time-window graph or the data structure, respectively, and the executing step reading from and deleting in the time-window graph or the data structure, respectively, of the method of FIG. 3 according to an embodiment of the present disclosure.

In detail, the nodes 111 and their time-windows (TW) can form a time-window graph or a data structure, as partially shown in FIGS. 6 and 8.

Step a) can comprise planning the movement path using an informed search algorithm, in the shown embodiment using an A*-algorithm, as shown in FIG. 6 left, for example, by the control device 150. In alternative embodiments, a different informed search algorithm may be used such as, for example, a D*-algorithm.

In detail, step a) can comprise planning the movement path (MP) such that a movement path period (MPP), a movement path length (MPL), and/or a number of movement turns (MT) can be minimized and/or such that wear of the transport plane 110 and/or wear of the drive elements 120 can be balanced, for example, by the control device 150 or the informed search algorithm, respectively.

In the embodiment shown in FIG. 1, for the planned movement path (MP) of the one sample container carrier 140 the movement path period (MPP), for example, by avoiding or keeping distance to the another sample container carriers 140, the movement path length (MPL) and the number of movement turns (MT), for example, which is three, can be minimized. Furthermore, the wear of the transport plane 110 and the wear of the drive elements 120 can be balanced.

In detail, the movement path (MP) or the drive can be planned iteratively or in sections, respectively, for example, by the, for example, iterative, search algorithm.

At least one iteration of the search algorithm can comprise analyzing the reachability out of the free time-window (fTW) of the one of the nodes (ni) to free time-windows (fTW) of the at least one next node (nj) and the at least one at least over-next node (nk) such that the planned movement of the one sample container carrier 140 can be nonstop from the one node (ni) over the next node (nj) to the at least one at least over-next node (nk), as shown in FIGS. 6 and 8.

In other words, for example, within each iteration, the search algorithm can try to extend a move through several free time windows (fTW), for example, in a straight direction or a, for example, one, dimension x, y.

For the embodiment shown in FIG. 1, the planned and being executed movement path (MP) or drive of the one sample container carrier 140 can comprise four movements, for example, movement sections. Three of the movements respectively can extend over at least three nodes 111 or electro-magnetic actuators 121, respectively, and can be planned nonstop movements. Between the, for example, nonstop, movements the one sample container carrier 140 has to stop, for example, for the movement turns (MT). The longest planned nonstop movement can extend over eleven nodes 111 or electro-magnetic actuators 121, respectively, for example, along one of the columns 127.

A next time for a next planned movement path of a sample container carrier between the transfer location 30, for example, as the start, and the transfer location 32, for example, as the goal, the next planned movement path may be different from the one before. For example, for the next planned movement path, the number of movement turns may be one or the next planned movement path may comprise two movements, for example, movement sections. The two movements respectively may extend over at least three nodes or electro-magnetic actuators, respectively, and may be planned nonstop movements. A first one of the next planned, for example, nonstop, movements may extend over twelve nodes or electro-magnetic actuators, respectively, for example, along one of the columns. A second one of the next planned, for example, nonstop, movements may extend over six nodes or electro-magnetic actuators, respectively, for example, along one of the rows.

In detail, a distance number of the at least over-next nodes (nk) can be limited such that the planned nonstop movement can have a limited movement length (LML). In the shown embodiment, the distance number is maximal nineteen. In alternative embodiments, the distance number may be different.

Furthermore, step a) can comprise reserving for the planned nonstop movement time-windows (TW) with same beginning time (BT), as shown in FIG. 6 right, for example, by the control device 150.

As a result, the reservations or the reserved time-windows (rTW), respectively, can have a substantially triangular shape.

Moreover, step a) can comprise planning the nonstop movement in dependence of an acceleration (AC) and/or a maximum speed (MSP), for example, if reached, and/or a deceleration (DC), for example, by the control device 150.

For example, the free time-window (fTW) of node (nj) shown in FIG. 6 left can hypothetically not be reachable out of the free time-window (fTW) of node (ni), if the current speed was zero, as acceleration may take too long to leave the node (ni) and the successive reserved time-window (rTW) may be violated. In contrast, if the sample container carrier was moving at full speed, the remaining size of the free time-window (fTW) of node (ni) hypothetically can be sufficient and the free time-window (fTW) of node (nj) hypothetically can be reachable.

Figure 7:
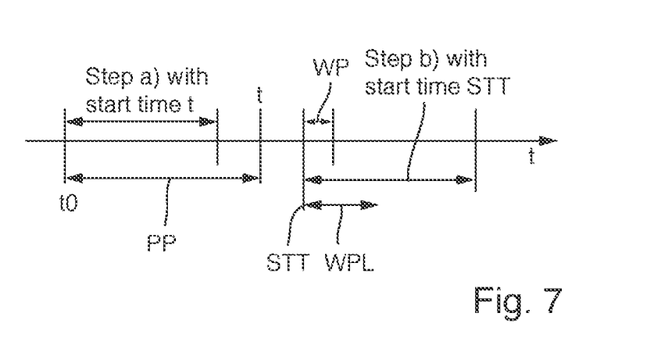
FIG. 7 illustrates schematically a timing of a planning step and an executing step of the method of FIG. 3 according to an embodiment of the present disclosure.

Further, step a) can comprise analyzing the reachability to time-windows (TW) only in the future after a planning period (PP), as shown in FIG. 7, for example, by the control device 150.

In detail, step a) can start or begin at the current time (t0). Only time-windows in the future after the current time (t0) plus the planning period PP time t=t0+PP are analyzed or considered.

Furthermore, the method can comprise performing step a) for one of the sample container carriers 140 at a time, for example, by the control device 150.

The result of the planning can be a list that can comprise all the nodes 111 (ni, nj, nk) along the movement path (MP) and the corresponding time-windows (TW), which can be defined by the entry times and the exit times at the nodes 111 (ni, nj, nk). The time-windows (TW) of the nodes 111 (ni, nj, nk) can be reserved, as shown in FIG. 6 right, 8 and 9, for example, by the control device 150. In detail, the reservation can be written to the time-window graph or the data structure, respectively.

Moreover, step b) can comprise executing, for example, of the reserved movement path (MP) or a movement of the reserved movement path (MP), when a start time (STT), for example, the beginning time (BT), has come, for example, by the control device 150.

Further, step b) can comprise executing, for example, of the reserved movement path (MP) or a movement of the reserved movement path (MP) such that a sequence of reserved time-windows (rTW) of, for example, the, sample container carriers 140 on at least one, for example, on all, of the nodes 111 (ni, nj, nk) can be maintained, for example, by the control device 150.

In detail, the next, for example, nonstop, movement or its nodes 111 (ni, nj, nk) or segment, respectively, of the one sample container carrier 140 can be read, for example, from the time-window graph or the data structure, respectively, as shown in FIGS. 8 and 10, for example, by the control device 150.

As soon as the start time (STT), for example, the beginning time (BT), has come and all the time windows (TW) of the next movement or segment can be the first reserved ones on the respective nodes 111 (ni, nj, nk), the entire movement or segment of the one sample container carrier 140 can be executed, for example, without any interference of one another of the sample container carriers 140.

In one embodiment, the executing step/s b) or the movement/s of the reserved movement path (MP) or its/their start time/s (STT) or beginning time/s (BT) can be decoupled from the planned and/or reserved time-windows (rTW) or times, respectively.

Furthermore, the method can comprise determining a waiting period (WP) for executing the reserved movement path (MP) or a movement of the reserved movement path (MP), for example, for the conditions start time (STT) or beginning time (BT), respectively, and reserved time windows (TW) of the next movement or segment can be the first ones to be fulfilled, and, if the determined waiting period (WP) exceeds a waiting period limit (WPL), re-planning a movement path (MP), as shown in FIGS. 7 and 10, for example, by the control device 150.

In the shown embodiment, one another of the sample container carriers 140 was longer than planned on a reserved node 111 or a reserved part of the transport plane 110 or above the corresponding electro-magnetic actuator 121, respectively, of the next movement or segment of the one sample container carrier 140. However, the waiting period (WP) was shorter than the waiting period limit (WPL), so a re-planning action may not be triggered.

Moreover, in the embodiment shown in FIG. 7, the start time (STT) can be later than the current time (t0) plus the planning period (PP) time t=t0+PP.

Further, step b) can comprise deleting a reserved time-window (rTW) of a node 111 (ni, nj, nk), for example, in the time-window graph or the data structure, respectively, after leaving the, for example, reserved, node 111 (ni, nj, nk) by the one sample container carrier 140, as shown in FIG. 8, for example, by the control device 150.

In detail, the planning step a) of the movement path (MP) of the one of the sample container carriers 140 and the executing step/s b) of at least one movement of the at least another one of the sample container carriers 140 can be performed simultaneously, as shown in FIG. 8, for example, by the control device 150.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A method of operating a laboratory sample distribution system, wherein the laboratory sample distribution system comprises
a plurality of sample container carriers, wherein the sample container carriers are configured to carry a laboratory sample container,
a transport plane, wherein the transport plane is configured to support the sample container carriers, and
a plurality of drive elements, wherein the drive elements are configured to move the sample container carriers on the transport plane, the method comprising:
a) planning a movement path (MP) for one of the sample container carriers from a start (ST) to a goal (GA) on the transport plane,
wherein the transport plane is logically modelled by a plurality of nodes,
wherein the nodes are free for at least one time-window (fTW) or reserved for at least one-time window (rTW),
wherein the planning comprises analyzing a reachability out of a free time-window (fTW) of one of the nodes (ni) to free time-windows (fTW) of at least one next node (nj) and at least one at least over-next node (nk) such that a planned movement of the one sample container carrier is nonstop from the one node (ni) over the next node (nj) to the at least one at least over-next node (nk), and
reserving the planned movement path (MP) comprising a sequence of time-windows (TW) of nodes (ni, nj, nk), the reserving comprising saving the planned movement path to a memory; and
b) executing, by controlling at least one of the drive elements, such that the one sample container carrier moves along the reserved movement path (MP) on the transport plane.

2. The method according to claim 1, wherein step a) comprises planning the nonstop movement in dependence of at least one of the group consisting of an acceleration, a maximum speed and/or a deceleration.

3. The method according to claim 1, wherein step a) comprises reserving, for a planned nonstop movement, time-windows with the same beginning time.

4. The method according to claim 1, wherein a distance number of the at least over-next nodes (nk) is limited such that the planned nonstop movement has a limited movement length.

5. The method according to claim 1, wherein step a) comprises analyzing a reachability to time-windows only in the future after a planning period.

6. The method according to claim 1, further comprising performing step a) for only one of the sample container carriers at a time and for no other sample container carrier at the same time.

7. The method according to claim 1, wherein step a) comprises planning the movement path taking into account at least one criteria selected from the group consisting of: a movement path period, a movement path length, a number of movement turns being minimized, wear of the transport plane being balanced, and wear of the drive elements being balanced.

8. The method according to claim 1, wherein step a) comprises planning the movement path using an informed search algorithm.

9. The method according to claim 8, wherein the informed search algorithm is an A*-algorithm or a D*-algorithm.

10. The method according to claim 1, wherein step b) comprises executing at a start time.

11. The method according to claim 1, wherein step b) comprises executing such that a sequence of reserved time-windows (rTW) of sample container carriers on at least one of the nodes (ni, nj, nk) is maintained.

12. The method according to claim 1, further comprising:
   determining a waiting period (WP) for executing the reserved movement path (MP); and
   if the determined waiting period (WP) exceeds a waiting period limit (WPL), planning a second movement path (MP).

13. The method according to claim 1, wherein the sample container carriers comprise a magnetically active device, wherein the drive elements comprise a plurality of electro-magnetic actuators, wherein the electro-magnetic actuators are stationary arranged below the transport plane and are configured to move the sample container carriers on the transport plane by applying a magnetic move force to the sample container carriers, wherein the nodes are assigned to the electro-magnetic actuators, and wherein step b) comprises executing, by controlling the electro-magnetic actuators, such that the one sample container carrier moves along the reserved movement path (MP) on the transport plane.

* * * * *